Patented Mar. 21, 1933

1,901,914

UNITED STATES PATENT OFFICE

JOHN W. LIVINGSTON, OF KIRKWOOD, MISSOURI, ASSIGNOR TO MONSANTO CHEMICAL WORKS, OF ST. LOUIS, MISSOURI, A CORPORATION OF MISSOURI

MANUFACTURE OF MALEIC ACID

No Drawing.   Application filed May 8, 1931. Serial No. 536,085.

This invention relates to the manufacture of maleic acid and it has particular application to the refining and purification of a crude maleic acid product.

Maleic acid may be obtained by the partial oxidation of various aromatic and heterocyclic compounds, notably, benzene, toluene, xylene, naphthalene, furfural, etc. Depending upon the character of the raw materials from which the maleic acid is produced, it will be found to contain various contaminating oxidation products and color imparting impurities. Thus, maleic acid obtained from toluene may contain benzoic acid, benzaldehyde and other products. On the other hand, the air oxidation of naphthalene results in the formation of phthalic anhydride as the principal product, which may be condensed from the gases upon cooling. The resulting vapors contain some maleic acid together with various other products which are recoverable by scrubbing the vapors with solvents such as water.

The separation of maleic acid from its impurities is effected advantageously by distillation. In this way organic nonvolatile tarlike materials, as well as other impurities commonly associated with maleic acid, such as fumaric acid, phthalic acid, etc., whose boiling points are substantially above that of the desired product, are left as a residue. However, distillation of maleic acid presents problems peculiar to itself, rendering the customary distillation practice inapplicable. Thus, for example, when maleic acid is exposed to distillation temperatures, it undergoes re-arrangement, forming fumaric acid. The presence of metals and certain impurities probably facilitate the transformation. Moreover, under certain conditions when maleic acid is heated, it sublimes in part and leaves a residue of fumaric acid.

Upon evaporating an aqueous solution of maleic acid, the water present distills. However, as the solution becomes concentrated the temperature rises, the formation of fumaric acid is accelerated and ultimately a dry cake is obtained consisting of a mixture of maleic acid and fumaric acid, which can be distilled only with extreme difficulty and then only with a sacrifice in yield.

According to this invention a solution of maleic acid is evaporated at reduced pressures, preferably at a temperature as low as is practically attainable until the consistence of the mixture undergoing distillation is such as to indicate separation of a substantial amount of solid material but still insufficient to interfere with continued stirring of the charge. Thereafter the degree of vacuum is released in order that the temperature of the mixture may be elevated and the charge becomes more fluid. The distillation of water is continued at the lesser degree of vacuum while avoiding solidification of the charge which is agitated continually. After the evolution of water vapors subsides or diminishes materially, the degree of vacuum is increased slowly until the water is driven off and dehydration of the maleic acid proceeds with distillation of maleic anhydride and water, the evolved vapors being condensed or absorbed in a saturated aqueous solution of maleic acid.

One example of the application of the principles of the present invention is hereinafter set forth: A 20%–30% aqueous solution of maleic acid (such, for example, as that obtained by scrubbing the off-gases from phthalic anhydride condensers employed in the air oxidation of naphthalene) is concentrated under reduced pressures (24–28 inches of mercury). For this purpose a fairly high vacuum is to be preferred in order that the temperature of the charge undergoing concentration may be as low as possible thereby inhibiting the formation of fumaric acid. If desired, the concentration may be conducted as a batch operation or the dilute maleic acid solution may be added to the still during the course of the distillation until a predetermined quantity of crude maleic acid has been introduced. A jacketed still may be employed advantageously, the heat being supplied by steam. A steam temperature of 120°–140° C. has been found satisfactory. The still should be provided with an agitating device in order to assure uniform temperature throughout the charge, avoid local overheating and facilitate the evaporation of the water in the charge. Care should be exercised to avoid solidification of the charge, although the evaporation may be continued until the charge contains a substantial amount of maleic acid in a solid phase. To this end, the still may be provided with a sight-glass to enable the operator to observe the consistency of the charge.

After the evaporation has proceeded under the high vacuum conditions until the charge has attained the consistency of a slurry, but without permitting the charge to become solid, the vacuum is reduced to 20-24 inches of mercury thereby assuring against solidification, the distillation being continued. When the consistency of the charge again approaches that prior to the reduction in degree of vacuum, the vacuum is again reduced to 16-20 inches of mercury and the heating is continued whereby additional water vapor is evolved. The distillation is allowed to proceed until the evolution of water vapor diminishes materially. With the reduction in degree of vacuum the temperature of the charge rises sufficiently to flux the charge completely and the danger of solidification is thus eliminated. Thereupon the vacuum is increased again to 27-29 inches of mercury, whereupon the charge, which at this stage contains but a small amount, if any, of uncombined water and will be found to be completely fluid, is distilled. The vapors which probably consist essentially of maleic acid or maleic anhydride and water are absorbed (either directly or in condensed form), preferably in a saturated solution of maleic acid wherein the maleic acid is cooled rapidly and precipitates out in crystalline form. Suitable cooling means for the solution may be provided to control the temperature and the water content of the absorbing medium. The product so obtained is crystalline, substantially colorless, practically free from the common impurities, particularly fumaric acid, and upon drying will be found suitable without further purification for the manufacture of maleic anhydride, succinic acid, maleic acid, esters of maleic acid, resins formed by the condensation of maleic acid and polyhydric alcohols, such as glycerin, etc.

It is to be understood that the degree of vacuum employed in the concentrating steps may be varied within wide ranges. In view of the advantages to be gained by the application of as low a temperature as possible, as high a degree of vacuum as possible is to be preferred. Similarly, the stage of the process at which the vacuum is reduced to avoid solidification of the mass may be varied within wide limits.

From the description herein set forth, it will be apparent that the process is susceptible to numerable modifications and variations without departing from the scope of the invention, which contemplates broadly the evaporation of an aqueous solution of maleic acid under reduced pressures while avoiding the solidification of the charge, reducing the vacuum before the charge would normally solidify, whereby the temperature thereof is increased and a liquid phase of maleic acid is assured, followed by distillation of the maleic acid from a liquid phase.

What I claim is:

1. The method of refining maleic acid, which consists in evaporating an aqueous solution thereof below atmospheric pressure whereby maleic acid in solid phase is produced while avoiding complete solidification of the charge, continuing the evaporation at a relatively lower degree of vacuum until substantially all of the water is evolved while maintaining a liquid phase in the still and, finally, increasing the degree of vacuum and distilling the acid product.

2. The method of refining maleic acid which consists in evaporating an aqueous solution of maleic acid at a vacuum pressure not substantially greater than that corresponding to 24 inches of mercury while avoiding solidification of the charge, until a substantial quantity of solid maleic acid is produced, continuing the evaporation at a relatively lesser degree of vacuum while maintaining a liquid phase until substantially all of the water has been evolved, and, finally, increasing the degree of vacuum and distilling the product in the presence of a liquid phase.

3. The method of refining maleic acid produced by the catalytic air oxidation of a hydrocarbon which consists in evaporating an aqueous solution of the maleic acid at a vacuum pressure of approximately 24-28 inches of mercury whereby a slurry of maleic acid crystals forms while avoiding solidification of the charge, continuing the evaporation at a relatively lesser degree of vacuum whereby the temperature of the slurry is increased and the maleic acid present in a solid phase is fluxed while at the same time water which is present is volatilized, and finally increasing the degree of vacuum to approximately 27-29 inches of mercury and distilling the maleic acid from its liquid phase.

In testimony whereof, I affix my signature.

JOHN W. LIVINGSTON.

CERTIFICATE OF CORRECTION.

Patent No. 1,901,914. March 21, 1933.

JOHN W. LIVINGSTON.

It is hereby certified that error appears in the printed specification of the above numbered patent requiring correction as follows: Page 2, line 52, for "maleic" first occurrence read "malic"; and that the said Letters Patent should be read with this correction therein that the same may conform to the record of the case in the Patent Office.

Signed and sealed this 16th day of May, A. D. 1933.

M. J. Moore.

(Seal) Acting Commissioner of Patents.